US010832201B2

(12) United States Patent
Bodman

(10) Patent No.: US 10,832,201 B2
(45) Date of Patent: Nov. 10, 2020

(54) CAPABILITY BASED PLANNING

(71) Applicant: ServiceNow, Inc., Santa Clara, CA (US)

(72) Inventor: Mark David Bodman, Austin, TX (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/939,027

(22) Filed: Mar. 28, 2018

(65) Prior Publication Data

US 2018/0322434 A1     Nov. 8, 2018

Related U.S. Application Data

(63) Continuation of application No. 15/723,766, filed on Oct. 3, 2017.

(60) Provisional application No. 62/502,244, filed on May 5, 2017.

(51) Int. Cl.
*G06Q 10/06* (2012.01)
*H04L 12/26* (2006.01)
*H04L 29/08* (2006.01)

(52) U.S. Cl.
CPC ... *G06Q 10/06393* (2013.01); *G06Q 10/0637* (2013.01); *H04L 43/08* (2013.01); *H04L 67/36* (2013.01)

(58) Field of Classification Search
CPC .......... G06Q 10/06393; G06Q 10/0637; H04L 43/08
See application file for complete search history.

(56) References Cited

U.S. PATENT DOCUMENTS 6,321,229 B1    11/2001  Goldman
6,816,898 B1    11/2004  Scarpelli
7,020,706 B2     3/2006  Cates
(Continued)

FOREIGN PATENT DOCUMENTS

WO    2012126089 A1    9/2012

OTHER PUBLICATIONS

Extended European Search Report for European Application No. 18170674.8 dated Sep. 20, 2018; 8 pgs.

*Primary Examiner* — Sujay Koneru
*Assistant Examiner* — Mohamed N El-Bathy
(74) *Attorney, Agent, or Firm* — Fletcher Yoder PC

(57) ABSTRACT

A method includes receiving hierarchy data indicating a capability hierarchy associated with a customer network, the capability hierarchy indicating that a first capability is a sub-capability of a second capability. The method further includes receiving application data from a MID server of the customer network, the application data associated with an application utilized by the customer network for the first capability. The method further includes determining, based on the application data, an application score indicating an effectiveness level of the application for the first capability. The method further includes determining, based on the application score, a first capability score associated with the first capability. The method further includes determining, based on the first capability score and the capability hierarchy, a second capability score of the second capability, the second capability score indicating a health metric of the second capability within the customer network.

20 Claims, 8 Drawing Sheets

(56) References Cited

U.S. PATENT DOCUMENTS

| | | | |
|---|---|---|---|
| 8,027,903 B2* | 9/2011 | Bishop | G06Q 40/00 |
| | | | 705/37 |
| 8,151,261 B2 | 4/2012 | Sirota | |
| 8,646,093 B2 | 2/2014 | Myers | |
| 9,065,783 B2 | 6/2015 | Ding | |
| 9,122,552 B2 | 9/2015 | Whitney | |
| 9,535,737 B2 | 1/2017 | Joy | |
| 9,819,729 B2 | 11/2017 | Moon | |
| 2003/0033191 A1 | 2/2003 | Davis et al. | |
| 2009/0187413 A1 | 7/2009 | Abels et al. | |
| 2010/0082380 A1 | 4/2010 | Merrifield, Jr. et al. | |
| 2010/0131330 A1 | 5/2010 | Merrifield, Jr. et al. | |
| 2012/0215574 A1* | 8/2012 | Driessnack | G06Q 10/0639 |
| | | | 705/7.12 |
| 2012/0226516 A1 | 9/2012 | Ahern et al. | |
| 2013/0066897 A1 | 3/2013 | Ehrenberg et al. | |
| 2016/0294800 A1 | 10/2016 | Oppenheim, Jr. et al. | |
| 2016/0373478 A1* | 12/2016 | Doubleday | H04L 63/1433 |
| 2017/0270432 A1* | 9/2017 | Sachdev | G06N 20/00 |

* cited by examiner

CAPABILITY BASED PLANNING

CROSS REFERENCE TO RELATED APPLICATIONS

This disclosure is a continuation of and claims priority to U.S. application Ser. No. 15/723,766, filed on Oct. 3, 2017, which claims priority to U.S. provisional application No. 62/502,244 filed on May 5, 2017, each of which is herein incorporated by reference in their entireties.

TECHNICAL FIELD

Embodiments described herein generally relate to capability based planning.

BACKGROUND ART

Cloud computing relates to the sharing of computing resources that are generally accessed via the Internet. In particular, the cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations in order to perform a variety computing functions that include storing and/or processing computing data. For users that are enterprises and other organizations, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing a local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, and/or customize applications and/or automating enterprise operations without maintaining network infrastructure and/or allocating computing resources normally associated with these functions.

Enterprises support increasingly large number of capabilities. For example, an enterprise may have a "sales" capability, a "product" capability, and a "legal" capability. As these capabilities become more complex, managing the people, processes, and technology that support the capabilities may become more difficult. In particular, it may be difficult to determine which people, processes, and technology may be improved to increase performance of the capabilities.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

According to one embodiment of the present disclosure, a method includes receiving, at a service platform customer instance, hierarchy data indicating a capability hierarchy associated with a customer network, the capability hierarchy indicating that a first capability is a sub-capability of a second capability. The method further includes receiving, at the service platform customer instance, application data from a management, instrumentation, and discover (MID) server of the customer network, the application data associated with an application utilized by the customer network for the first capability. The method further includes determining, based on the application data, an application score indicating an effectiveness level of the application for the first capability. The method further includes determining, based on the application score, a first capability score associated with the first capability, the first capability score indicating a health metric of the first capability within the customer network. The method further includes determining, based on the first capability score and the capability hierarchy, a second capability score of the second capability, the second capability score indicating a health metric of the second capability within the customer network.

In another embodiment, the method may be embodied in computer executable program code and stored in a non-transitory storage device. In yet another embodiment, the method may be implemented in an electronic device.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
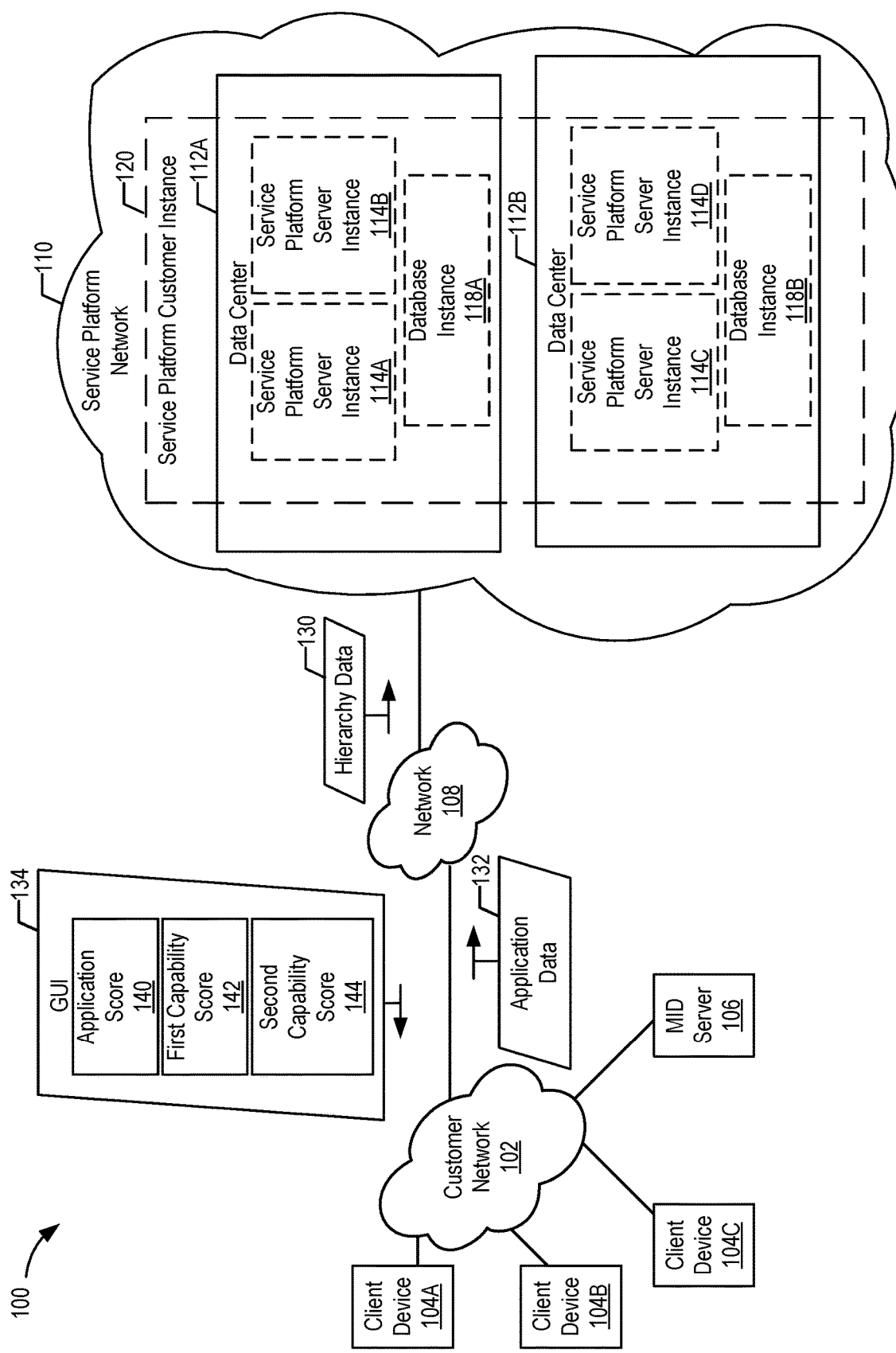
FIG. 1 is a schematic diagram of a system for capability based planning.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing device" may refer to a device that includes, but is not limited to a single computer, host, server, laptop, and/or mobile device.

As used herein, a computer-readable storage device is an article of manufacture.

As used herein, the term "network device" may refer to any device that is capable of communicating and transmitting data to another device across any type of network.

As used herein, the term "computing system" may refer to a single electronic computing device or network device that includes, but is not limited to a single computer, virtual machine, virtual container, host, server, laptop, and/or mobile device. The term "computing system may also refer to a plurality of electronic computing devices and/or network devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Sequences of method steps presented herein are provided as examples and are not meant to be limiting. Thus, methods according to the disclosure may be performed in an order alternative to that illustrated in the figures and described herein. To illustrate, a method described as including steps "A" and "B" may be performed with "A" either preceding or following "B," unless a specific order is indicated.

Systems and methods according to the present disclosure may enable capability based planning. In particular, a system may generate capability scores for a plurality of capabilities associated with a customer network. In addition, the system may provide a technology risk assessment of applications used by the customer network for the capabilities.

FIG. 1 is a schematic diagram of an embodiment of a computing system 100 (e.g., a cloud computing system) where embodiments of the present disclosure may operate. The computing system 100 includes a customer network 102, a network 108, and a service platform network 110. In some embodiments, the customer network 102 includes a local private network, such as local area network (LAN) that includes a variety of network devices (e.g., switches, servers, routers, etc.). In some embodiments, the customer network 102 corresponds to an enterprise network that includes one or more LANs, virtual networks, data centers, other remote networks, or a combination thereof. As shown in FIG. 1, the customer network 102 is communicatively coupled to client devices 104A-C so that the client devices 104A-C are able to communicate with each other via the customer network 102. The client devices 104A-C may be computing systems and/or other types of computing devices that access cloud computing services, for example, via a web browser application. FIG. 1 also illustrates that the customer network 102 includes a management, instrumentation, and discovery (MID) server 106 that facilitates communication of data between the service platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to the network 108, which is further coupled to the service platform network 110. The network 108 is configured to transmit messages between the service platform network 110 and the customer network 102, the MID server 106 and the client devices 104A-C. The network 108 includes one or more computing networks available today, such as other LANs, wide area networks (WAN), the Internet, and/or other remote networks. Each of the computing networks within the network 108 may contain wired and/or wireless programmable devices that operate in the electrical and/or optical domain. For example, the network 108 may include wireless networks, such as cellular networks (e.g., Global System for Mobile Communications (GSM) based cellular network) wireless fidelity (Wi-Fi®) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, the network 108 may include a variety of network devices, such as servers, routers, network switches, and/or other network hardware devices configured to transport data over networks.

The service platform network 110 is a remote network (e.g., a cloud network) that provides one or more services to devices, such as devices associated with the customer network 102, via the network 108. To illustrate, the service platform network 110 may act as a platform that provides additional computing resources to the client devices 104A-C and/or customer network 102. For example, by utilizing the developmental the service platform network 110, users of the client devices 104A-C may be able to build and execute applications, such as automated processes for various enterprise, information technology (IT), and/or other organization-related functions.

The service platform network 110 includes data centers 112A-B. Each of the data centers 112A-B may be located in different geographic location. Each of the data centers 112A-B includes one or more computing devices configured to provide one or more instances of one or more services.

In the example, of FIG. 1, devices of the datacenter 112A provide service platform server instances 114A-B and a database instance 118A while devices of the data center 112B provides server instances 114C-D and a database instance 118B. Examples of server instances include application server instances, web server instances, etc. accessible to customer devices (e.g., the client devices 104A-C). Database instances are distinct databases that store customer data. Each server instance 114 and each database instance 118 can be implemented on a physical computing system that includes a single electronic computing device (e.g., a single physical hardware server) or multiple-computing device (e.g., multiple physical hardware servers). A single computing device may provide more than one server instance 114 and/or database instance 118.

In the example of FIG. 1, the service platform network 110 is arranged in a multi-instance cloud architecture. In a multi-instance cloud architecture, the service platform network 110 provides services to a plurality of customers and resources (e.g., instances) of the data centers 112A-B are grouped into service platform customer instances associated with the plurality of customers, where each service platform customer instance is unique to a customer. Each resource (e.g., instance) included in a service platform customer instance is unique to that service platform customer instance. Accordingly, data stored in one customer's database instance may not be mixed with data stored in another customer's database instance and server instances that provide services to one customer may not provide services to another customer. Further, one of the datacenters 112A-B may actively provide services to a customer while the other datacenter mirrors the active datacenter. In response to an error or a scheduled update to the active datacenter, the mirror datacenter may begin actively providing services to the customer.

Because each customer has its own unique software stack (e.g., instances) in the multi-instance cloud architecture, each customer's data is isolated from other customers' data. Accordingly, individual clients are not put at risk by security practices of other clients. Further, each customer may determine its own upgrade schedule. In addition, since each client instance is mirrored to a second datacenter, services provided by the client instances may be more readily available during maintenance and upgrades. In alternative embodiments, the system 100 may have more or fewer components arranged in different combinations. For example, the service platform network 110 may include more than two data centers.

In the illustrated example, a service platform customer instance 120 is associated with a customer who uses (e.g., owns, operates, etc.) the customer network 102. The service platform customer instance 120 includes the service platform server instances 114A-D and the database instances 118A-B. Accordingly, the service platform server instances 114A-D and the database instances 118A-B provide one or more services to the customer associated with the customer network 102. Such services may include enhancing capabilities of the customer network 102, providing analysis of the customer network 102, hosting information portals accessible to the customer network 102 and other devices (e.g., via a web interface) associated with the client, etc. In particular, as described herein, the service platform customer instance 120 provides capability based planning and technology risk assessment tools to an operator of the customer network 102.

In an illustrative example of the system 100, the service platform server instance 114A corresponds to a capability based planning application accessible to devices associated with the customer network 102 via a web interface or via other means. The database instance 118A stores data associated with the capability based planning application. The service platform server instance 114C and the database instance 118B correspond to a mirrored versions of the service platform server instance 114A and the database instance 118B respectively.

In operation, the client device 104A transmits hierarchy data 130 to the service platform server instance 114A, and the service platform server instance 114A stores the hierarchy data 130 in the database instance 118A. For example, a user of the client device 104A may navigate a web browser to access a graphical user interface (GUI) 134 provided via a web interface of the service platform service instance 114A, and the hierarchy data 130 may correspond to data input via the GUI 134. The service platform network 110 mirrors the hierarchy data 130 in the database instance 118B.

The hierarchy data 130 identifies a hierarchy of capabilities provided by the customer network 102 and identifies one or more applications or technologies utilized by the customer network to provide the capabilities. A capability is a function of an organization. The organization may use one or more applications or other technologies for the capability. For example, the organization may use a database application for a human resources capability. The hierarchy of capabilities identifies which capabilities are sub-capabilities of other capabilities. An example of a capability is "sales." That is, an organization may have a sales function. A "change design" capability may be a sub-capability of the "sales" capability. A database application may be used by the customer network 102 to provide the sales function. In an illustrative example, the hierarchy data 130 indicates that a first capability is a sub-capability of a second capability and that an application is used by the customer network 102 to provide the first capability. Applications used by the customer network 102 may be executed by devices of the customer network 102, by devices associated with the customer network 102 (e.g., the client devices 104A-C), by devices accessible to the customer network 102 (e.g., via the network 108), or a combination thereof.

The service platform server instance 114A assigns a capability score to each assessed capability in the capability hierarchy, as described further below. Capabilities for which insufficient data is available may not be scored. The capability scores indicate (e.g., correspond to) health metrics of the capabilities of the organization. The health metrics indicate how well equipped an organization is to provide the capability. For example, a high score may indicate that the organization is well equipped to provide the associated capability. Conversely a low score may indicate that the organization is not well equipped to provide the associated capability. Accordingly, the capability scores may be used to identify "gaps" the organization's abilities to provide capabilities. A gap is a relative inadequacy in the organization's ability to provide a capability. Using the capability scores, the service platform server instance 114A may identify which capabilities have "no gap," which capabilities have a "medium gap," and which capabilities have a "high gap." For example, capabilities having capability scores that fall within a first range may be identified as having a high gap, capabilities having capability scores that fall within a second range may be identified as having a medium gap, and capabilities having scores that fall within a third range may be identified as having no gap. High gap, medium gap, and no gap are examples of gap-based classifications for capabilities. Other implementations may include more or fewer gap-based classifications.

A capability score of an application is determined by the service platform server instance 114A based on a technology score of the application, a process score of the application, a people score of the application, capability scores of sub-capabilities of the application, or a combination thereof. For example, the service platform server instance 114A may set the capability score of the capability to an aggregate (e.g., average) of the technology score, the process score, the people score, and the capability scores of the sub-capabilities. The technology score is an aggregate of application scores associated with the capability. Each application score may be based on a cost, quality, risk, user satisfaction, business alignment, or a combination thereof of the associated application. Cost refers to a monetary amount. Quality refers to a level of excellence. Quality may be determined based on objective data (e.g., test results generated by the MID server 106), based on subjective data input by a user (e.g., of one of the client devices 104A-C), or a combination thereof. Risk may refer to a liability risk, a technology risk (as described further herein), or a combination thereof. User satisfaction may be based on user survey data (e.g., provided by the MID server 106 or the client devices 104A-C). Business alignment indicates how well a person, process, or technology aligns with business goals. Business alignment may be based on data entered (e.g., by a business manager) at one of the client devices 104A-C. Thus, the technology score indicates an overall health score for technology used by the organization to provide the capability. The process score is an aggregate score based on cost, quality, risk, user satisfaction, business alignment, or a combination thereof of processes used to support the capability. Thus, the process score indicates an overall health score for processes used by the organization to provide the capability. The people score is an aggregate score based on cost, quality, risk, user satisfaction, business alignment, or a combination thereof of people (e.g., employees) who provide a capability. Thus, the people score indicate an overall health score for people used by the organization to provide the capability. The technology score, the process score, the people score, or a combination thereof is determined by the service platform server instance 114A based on data received from the customer network 102. The data may be input by users (e.g., of the client devices 104A-C) and/or automatically generated based on application data (e.g., from the MID server).

In the illustrated example of FIG. 1, the service platform server instance 114A receives application data 132 from the customer network 102. The application data 132 may include data transmitted from the MID server 106, one or more of the client devices 104A-C, or a combination thereof. The application data 132 indicates metrics associated with the application used by the customer network 102 to provide the first capability. The application data 132 may include results of automatically executed tests, metrics input by a user, or a combination thereof. For example, an administrator of the customer network 102 may configure the MID server 106 to periodically perform one or more automated tests of the application associated with the first capability. The application data 132 may include results of such tests. In some examples, the application data 132 identifies cost, quality, risk, user satisfaction, business alignment, or a combination thereof of one or more applications with respect to one or more capabilities. In some examples, the application data 132 includes an automatically generated (e.g., by the MID server 106) of applications used by the customer network 102.

Based on the application data 132, the service platform server instance 114A determines an application score 140 of the application with regard to the first capability. The application score 140 indicates how well the application supports the first capability. For example, the application score 140 may indicate how well a database application supports a manage opportunities capability. The service platform server instance 114A may determine a technology score of the first capability based on the application score 140. To illustrate, the technology score of the first capability may be an aggregate (e.g., an average) of application scores of applications associated with the first capability and applications associated with sub-capabilities of the first capability. Each application score indicates whether the corresponding application has a gap.

Based on the technology score of the first application, the service platform server instance 114A determines a first capability score 142 of the first capability. For example, the service platform server instance 114A may set the first capability score 142 to an aggregate of the technology score of the first capability, a process score of the first capability, and a people score of the first capability. The aggregate may be an average of the values, a summation of the values, or any other value that takes into consideration the technology score, process score, and people score. The process score and the people score may be received from the customer network 102 (e.g., from one of the client devices 104A-C or from the MID server 106) or determined based on data received from the customer network 102. For example, an administrator (operating one of the client devices 104A-C) may input the people score and/or the process score via the GUI 134 provided by the service platform server instance 114A.

As described above, the capability hierarchy indicates that the first capability is a sub-capability of the second capability. Accordingly, the service platform server instance 114A may determine a second capability score 144 based on the first capability score 142 and the capability hierarchy. For example, the second capability score 144 may correspond to an aggregate of capability scores of sub-capabilities of the second capability. The service platform server instance 114A includes the application score 140, the first capability score 142, and the second capability score 144 in the GUI 134, as described further below. Further, the GUI 134 may indicate whether the customer network 102 has a high gap, a medium gap, or no gap with regard to the first capability and the second capability based on the first capability score 142 and the second capability score 144.

In some examples, the service platform server instance 114A further includes in the GUI 134 a recommendation to improve capability scores of capabilities provided by the customer network 102. For example, the service platform server instance 114A may identify an alternative application that has a higher technology score associated with a capability. Accordingly, the GUI 134 may indicate the alternative application. As another example, the server platform server instance 114A may identify training opportunities or recommendations in response to a low people score associated with a particular capability. As another example, the server platform server instance 114A may identify process improvements in response to a low process score associated with a particular capability.

In addition to capability based planning, the service platform server instance 114A may provide additional services. For example, the service platform server instance 114A may enable an administrator to view technology risks based on technology life cycles. To illustrate, the application data 132 may include life cycle data indicating life cycles of applications used by the customer network 102. Life cycle data may be input by a client device via the GUI 134 or may be collected from the MID server 106. The life cycle data indicates life cycles associated with one or more of the applications used by the customer network 102 to provide the capabilities indicated by the hierarchy data 130. In particular, for each application the life cycle data indicates periods of developer (e.g., external) support and periods of internal support associated with the application. The periods of developer support may include a pre-release period, a general availability period, an end of life period, and an obsolete period. The periods of internal use may include an early adopter period, a mainstream period, a declining use period, and a retired period.

Figure 3:
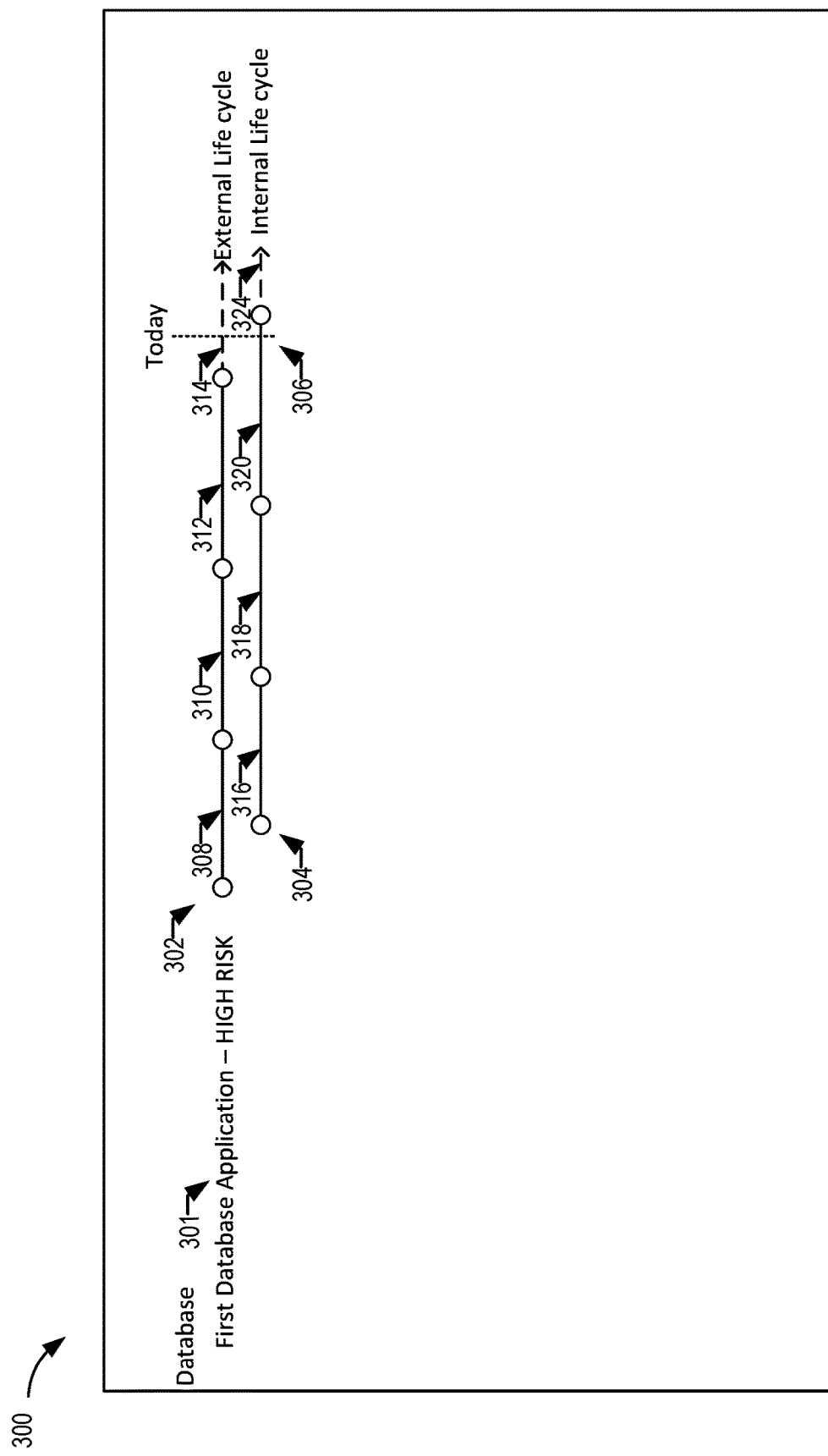
FIG. 3 is a screen of the GUI that may be generated by the system to indicate technology risks.

The service platform server instance 114A generates a risk score for each application based on the life cycle data and a current time. The risk score for an application may be determined by the service platform server instance 114A based further on a level of importance of the application or of a capability that uses the application to the organization associated with the customer network 102. To illustrate, the risk score indicated by the life cycle data may be weighted by the level of importance of the application. The level of importance may be indicated by the application data 132. In some examples, the server platform server instance 114A determines the application score 140 based in part on a risk score of the application associated with the application score 140. Accordingly, the first capability score 142 may be based on the risk score. In some implementations, the server platform server instance 114A considers the lifecycle data when making a recommendation to improve a capability score. For example, the server platform server instance 114A may select a replacement application associated with life cycle data that indicates a relatively long duration of remaining developer support. An example GUI screen displaying application life cycles is illustrated in FIG. 3.

Thus, FIG. 1 illustrates how a service platform server instance in a multi-instance cloud architecture is able to provide information that may be used in capability based planning by an administrator of a customer network. The system 100 can be used by an administrator to more easily identify capabilities that would benefit from investment. Further, the system 100 may recommend particular types of investment to improve the capabilities. In addition, the multi-instance cloud architecture is able to provide information that may be used in technology risk based planning by an administrator of a customer network.

Figure 2A:
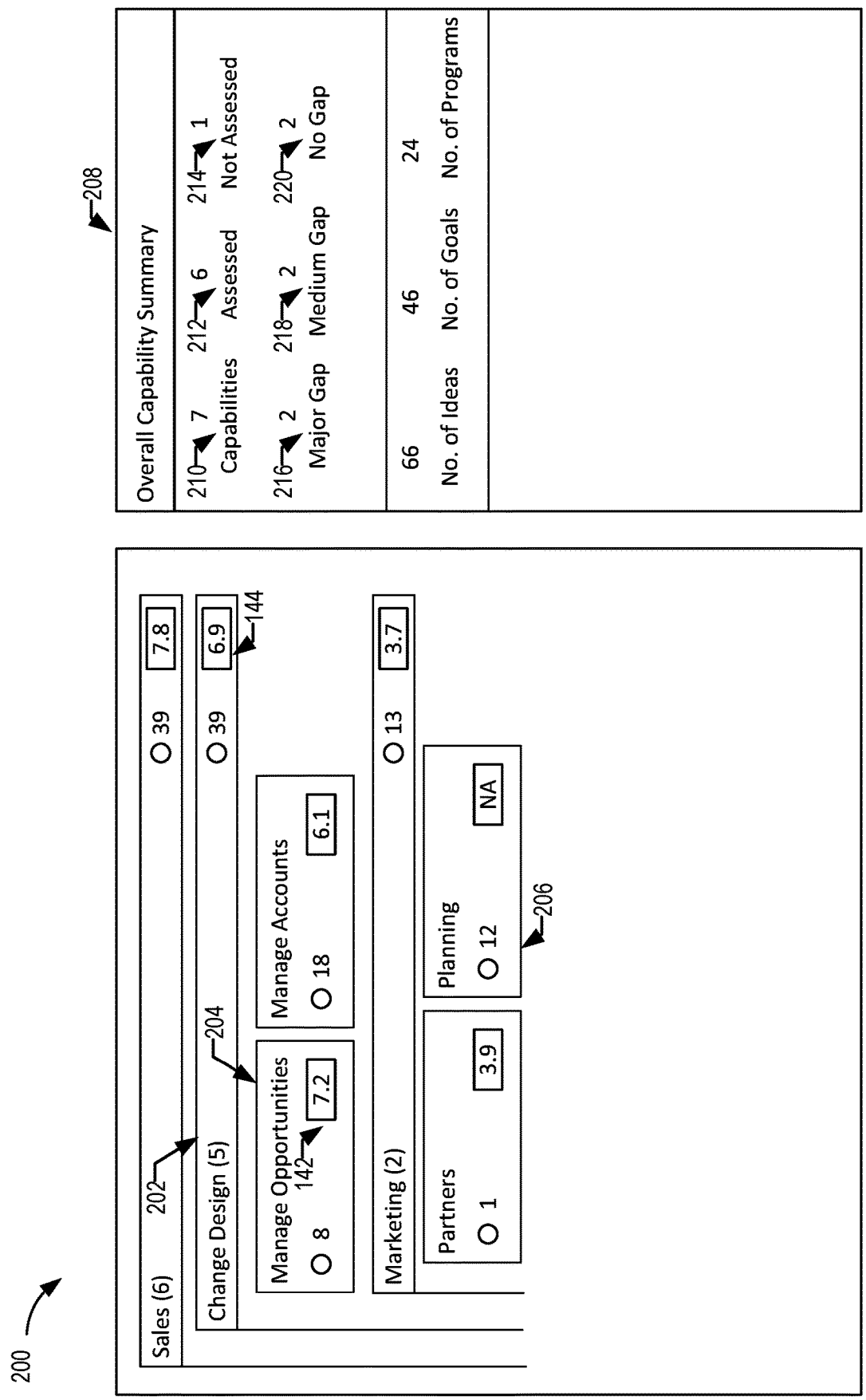
FIG. 2A is a first screen of a graphical user interface (GUI) that may be generated by the system for capability based planning.

Referring to FIG. 2A, a screen 200 of the GUI 134 is shown. The screen 200 may be displayed at one of the client devices 104A-C. The screen 200 illustrates the capability hierarchy defined by the hierarchy data 130. As illustrated in FIG. 2A, a "change design" capability 202 is a sub-capability of a "sales" capability. The "change design" capability 202 includes the sub-capabilities of "manage opportunities" 204, "manage accounts," and "marketing." The "marketing" capability includes the sub-capabilities of "partners" and "planning" 206. As illustrated in FIG. 2A, the "manage opportunities" capability 204 corresponds to the first capability, and the "change design" capability 202 corresponds to the second capability described above with reference to FIG. 1. The screen 200 illustrates the first capability score 142 (e.g., 7.2) and the second capability score 144 (e.g., 6.9). Further, the screen 200 indicates how many sub-capabilities are associated with each capability and how many applications are associated with each capability. For example, the "change design" capability has five sub-capabilities and is associated with thirty nine applications. Eight of the thirty nine applications are associated with the "manage opportunities" capability 204.

The screen 200 further includes an overall capability summary 208 of capabilities associated with the customer network 102. The overall capability summary 208 includes a first element 210 indicating that the customer network 102 supports seven capabilities. The number of capabilities may be derived from the hierarchy data 130. The overall capability summary 208 further includes a second element 212 indicating that six capabilities have been assessed and a third element 214 indicating that one capability has not been assessed. In the illustrated example, the "planning" capability 206 has not been assessed and has no capability score. The "planning" capability may not be assessed by the service platform server instance 114A due to a lack of information regarding the "planning" capability 206.

The overall capability summary 208 further indicates how many of the assessed capabilities have a major gap, how many of the assessed capabilities have a medium gap, and how many of the assessed capabilities have no gap. In the illustrated example, a fourth element indicates that two of the assessed capabilities have a major gap, a fifth element 218 indicates that two of the assessed capabilities have a medium gap, and a sixth element 220 indicates that two of the assessed capabilities have no gap. Capabilities that have a capability score of 1-4 may be classified as having a major gap, capabilities that have a capability score of 4-7 may be classified as having a medium gap, and capabilities that have a capability score of 7-10 may be classified as having no gap. Accordingly, the service platform server instance 114A classifies the "partners" capability and the "marketing" capability as having major gaps. Further, the service platform server instance 114A classifies the "manage accounts" capability and the "change design" capability 202 as having medium gaps. Further, the service platform server instance 114A classifies the "sales" capability and the "manage opportunities" capability 204 as having no gaps.

In some implementations, the service platform server instance 114A color codes capability scores displayed in the GUI 134 based whether the capability scores indicate a gap. To illustrate, a background of the first capability score 142 displayed in the screen 200 may be green indicating that the "manage opportunities" capability 204 has no gap. A background of the second capability score 144 displayed in the screen 200 may be yellow indicating that the "change design" capability 202 has a medium gap. Similarly, a background of a capability score of the "marketing" capability may be red indicating that the marketing capability has a major gap. In other implementations, different combinations of colors may be used. Capabilities with a major gap may be associated with a high upgrade priority, capabilities with medium gaps may be associated with an intermediate upgrade priority, and capabilities with no gaps may be associated with a low upgrade priority. Accordingly, an administrator viewing the screen 200 may be able to quickly identify upgrade priorities associated with capabilities.

The GUI 134 is interactive. Based on input received from a client device, the service platform server instance 114A updates the GUI 134. For example, in response to receiving a selection of the second element 212, the service platform server instance 114A may update the GUI 134 to display only information related to assessed capabilities. In response to receiving a selection of the third element 214, the service platform server instance 114A may update the GUI 134 to display only information related to not assessed capabilities. In response to receiving a selection of the fourth element 216, the service platform server instance 114A may update the GUI 134 to display only information related to capabilities with major gaps. In response to receiving a selection of the fifth element 218, the service platform server instance 114A may update the GUI 134 to display only information related to capabilities with medium gaps. In response to receiving a selection of the sixth element 220, the service platform server instance 114A may update the GUI 134 to display only information related to capabilities with no gaps.

Figure 2B:
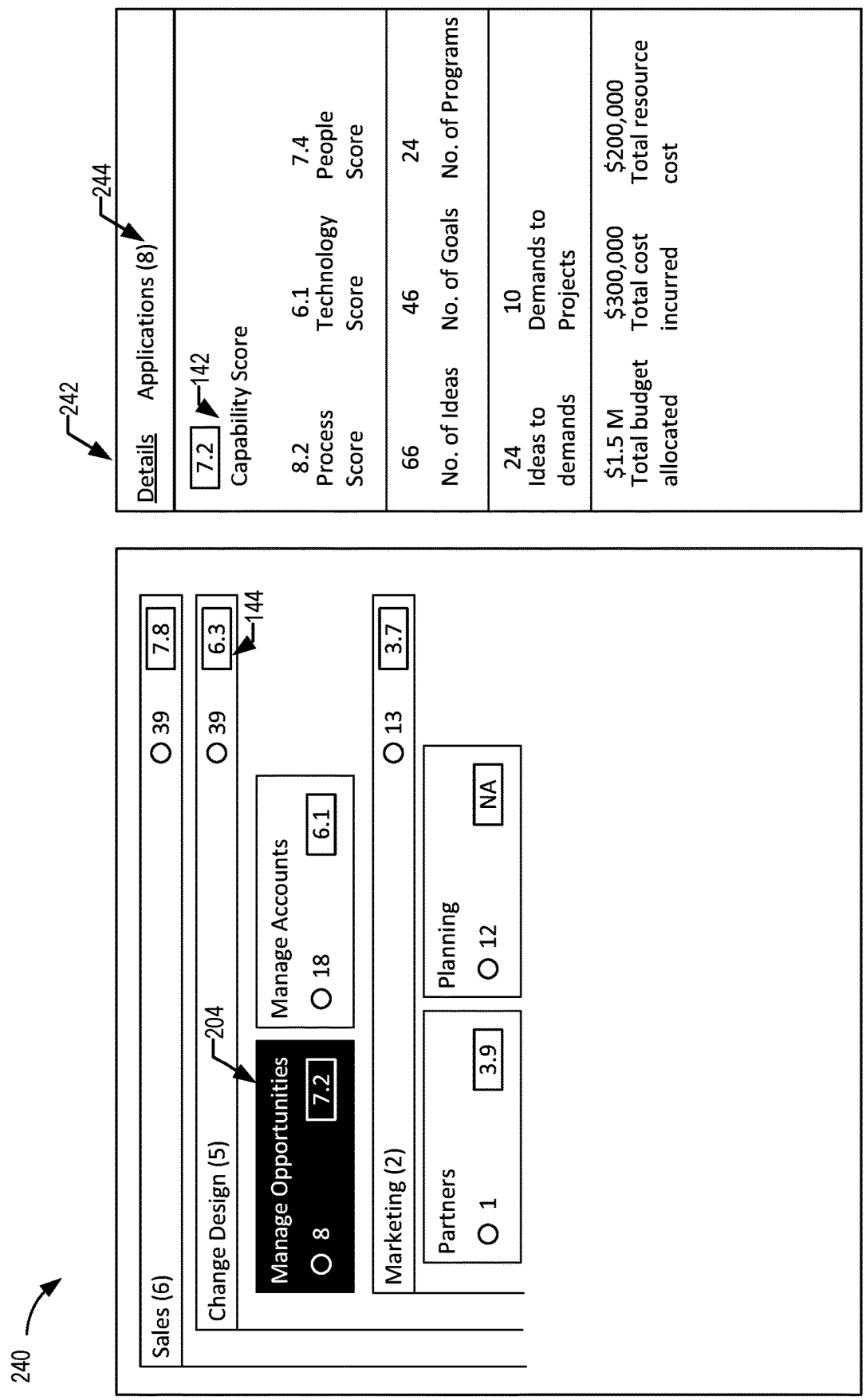
FIG. 2B is a second screen of the GUI that may be generated by the system for capability based planning.

Referring to FIG. 2B, a second screen 240 of the GUI 134 is shown. The service platform server instance 114A may generate the second screen 240 in response to receiving a selection of the "manage opportunities" capability 204 from the screen 200. The second screen 240 includes a details panel 242 related to the selected capability (e.g., the manage opportunities capability 204). In particular, the details panel 242 identifies the first capability score 142 of the "manage opportunities" capability 204 and indicates the process score, technology score, and people score that the first capability score 142 is based on.

The details panel 242 further includes an applications element 244. The applications element 244 indicates that customer network 102 uses eight applications to provide the "manage opportunities" capability 204. In response to selection of the applications element 244, the service platform server instance 114A may generate a third screen 260. The third screen 260 includes an applications panel 262 that indicates an application score for each application associated with providing the "manage opportunities" capability 204. In particular, the third screen 260 identifies the application score 140 described with reference to FIG. 1. The technology score displayed on the second screen 240 is an aggregate of the application scores displayed on the third screen 260. Further, the process score displayed on the second screen 240 may be based in part on the application scores displayed on the third screen 260. If the "manage opportunities" capability 204 had sub-capabilities, the applications element 244 may include application scores associated with applications used by the sub-capabilities. Accordingly, a capability's capability score may be an aggregate of capability scores of sub-capabilities of the capability. In some implementations, the application scores displayed on the third screen 260 are specific to the selected application (e.g., the "manage opportunities" capability 204). In other implementations, an application score for an application is the same for each capability that uses the application.

Figure 2C:
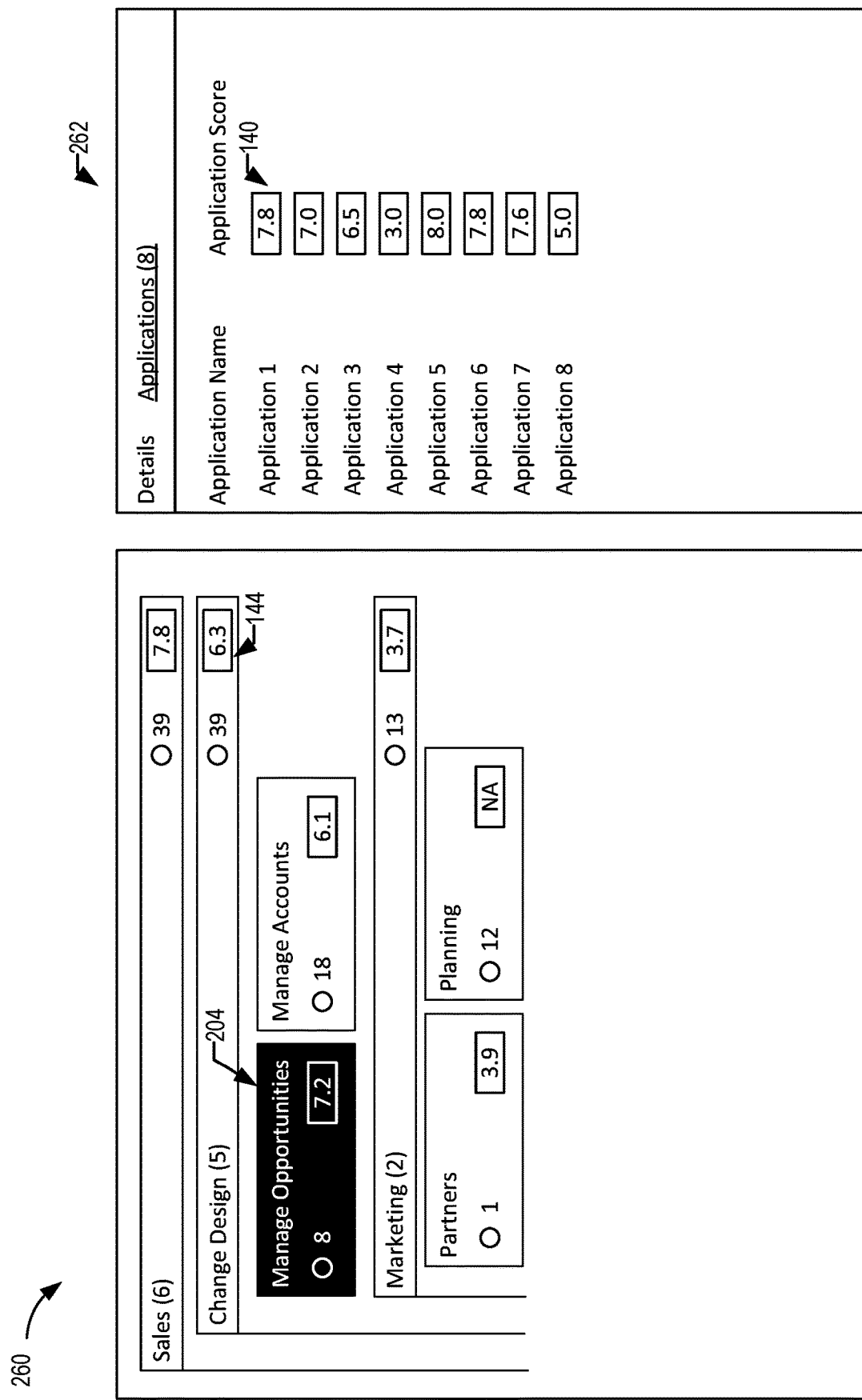
FIG. 2C is a third screen of the GUI that may be generated by the system for capability based planning.

As described above, FIGS. 2A-C illustrate screens of a GUI that may be generated by a service platform server instance to enable an administrator to assess gaps in capabilities provided by an organization. Accordingly, an administrator may more easily identify which areas of an organization may benefit from investment. Because the capabilities are arranged in a hierarchy, the administrator is able to identify specific sub-capabilities that may benefit from investment. Further, the GUI enables the administrator to see which aspect (e.g., people, process, or technology) of a capability might benefit from investment.

Referring to FIG. 3, a screen of 300 of the GUI 134 is illustrated. The screen 300 may be used for technology risk planning. The screen 300 depicts an external life cycle timeline 302 and an internal life cycle timeline 304 associated with a first database application 301. Additionally a marker 306 identifies today relative to the timelines 302, 304. The external life cycle timeline 302 indicates a prerelease period 308, a general availability period 310, an end of life period 312, and an obsolete period 314. The internal life cycle timeline 304 indicates early adopter period 316, a mainstream period 318, a declining use period 320, and a retired period 324. The service platform server instance 114A generates the screen 300 based on life cycle data received from the customer network 102, as described above. The service platform server instance 114A may further determine technology risk associated with applications based on one or both of the external life cycle timeline 302 and the internal life cycle timeline 304. For example, the closer the today marker is to the obsolete period 314 and/or the retired period 324 the higher the technology risk score of an application may be. In some implementations, the technology risk is weighted based on an importance of the associated application to an organization. Some applications may not have an associated internal life cycle timeline (e.g., because an organization relies on the application's developer for support and does not support the application internally). The screen 300 indicates that the first database application 301 has a high risk (e.g., because the marker 306 is located in the obsolete period 314 of the external life cycle timeline 302 and is close to the retired period 324 of the internal life cycle timeline 304). Based on the technology risk, service platform server instance 114A may further display an upgrade recommendation (not shown). The upgrade recommendation may identify a suggested application to upgrade, a recommended replacement application, or a combination thereof. The recommended replacement application may have a relatively longer duration of developer or internal support as compared to the suggested application to upgrade. Thus, FIG. 3 illustrates a GUI screen that may be used by an administrator for planning based on technology risk.

Figure 4:
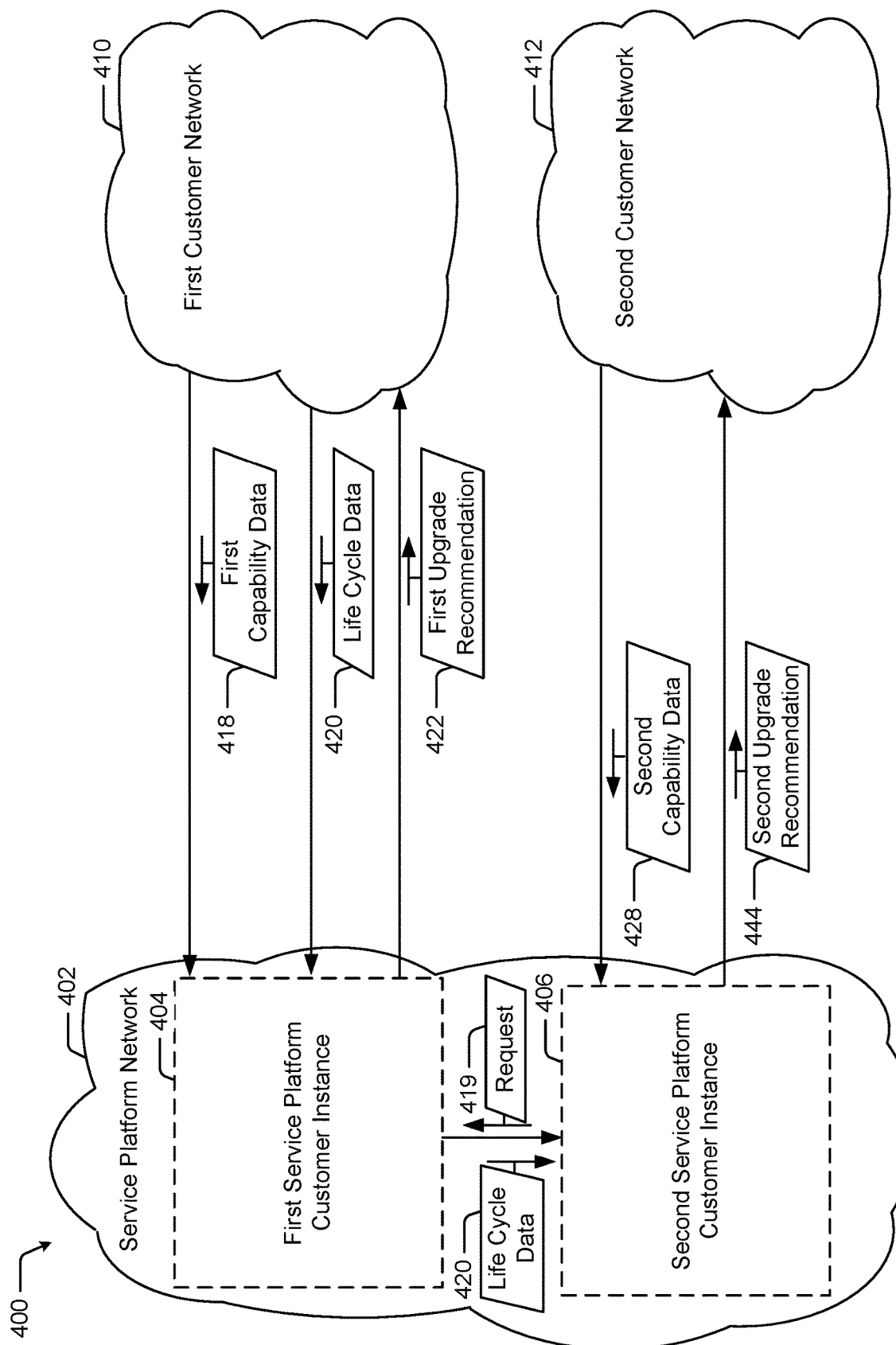
FIG. 4 is diagram illustrating service platform customer instances sharing data.

Referring now to FIG. 4, a diagram of a system 400 is shown. FIG. 4 depicts how a service platform customer instances may transmit some data to another service platform customer instance. The system 400 may correspond to the system 100. As depicted in FIG. 4, the service platform network 402 provides a first service platform customer instance 404 to a first customer network 410 and a second service platform customer instance 406 to the second customer network 412. The customer networks 410, 412 may be structured similarly to the customer network 102.

In operation, the first customer network 410 transmits first capability data 418 to the first service platform customer instance 404. The first capability data 418 identifies a capability and an associated application. In addition, the first customer network 410 transmits life cycle data 420 identifying a lifecycle of the application. Based on the first capability data 418 and the life cycle data 420, the first service platform customer instance 404 transmits a first upgrade recommendation 422 to the first customer network 410 (e.g., based on a technology risk of the application as described above).

The second customer network 412 transmits second capability data 428 identifying a second capability and indicating that the second customer network 412 uses the application to support the second capability. The second customer network 412 does not transmit life cycle data to the second service platform customer instance 406. As described above, databases of the service platform customer instances 404, 406 are distinct. Accordingly, the second service platform customer instance 406 does not have access to the life cycle data 420 in the first service platform customer instance 404.

The second service platform customer instance 406 may send a request 419 to the first service platform customer instance 404 for the life cycle data 420. The request 419 may correspond to a poll of all customer instances provided by the service platform network 402. In response to the request 419, the first service platform customer instance 404 transmits the life cycle data 420 to the second service platform customer instance 406. In some implementations, the first service platform customer instance 404 determines access permissions associated with the life cycle data 420 before transmitting the life cycle data 420 to the second service platform customer instance 406. For example, the life cycle data 420 may be transmitted from the first customer network 410 with an indication of whether sharing the life cycle data 420 between customer instances is permitted.

Based on the second capability data 428 and the life cycle data 420, the second service platform customer instanced 406 transmits a second upgrade recommendation 444 to the second customer network 412 (e.g., based on a technology risk of the application as described above). While illustrated as life cycle data, other types of data may be shared between the customer instances 404, 406 based on access permissions set by a customer network that originates the data. For example, the first service platform customer instance 404 may receive application data from the second service platform customer instance 406. Based on the application data from the second service platform customer instance 406, the first service platform customer instance 404 may identify an application score associated with a replacement application. In response to the application score of the replacement application exceeding an application score of an application used by the first customer network 410 for a capability, the first service platform customer instance 404 may transmit, to the first customer network 410, a recommendation to replace the application with the replacement application. Thus, FIG. 4 illustrates how customer instances may share data in some situations.

Figure 5:
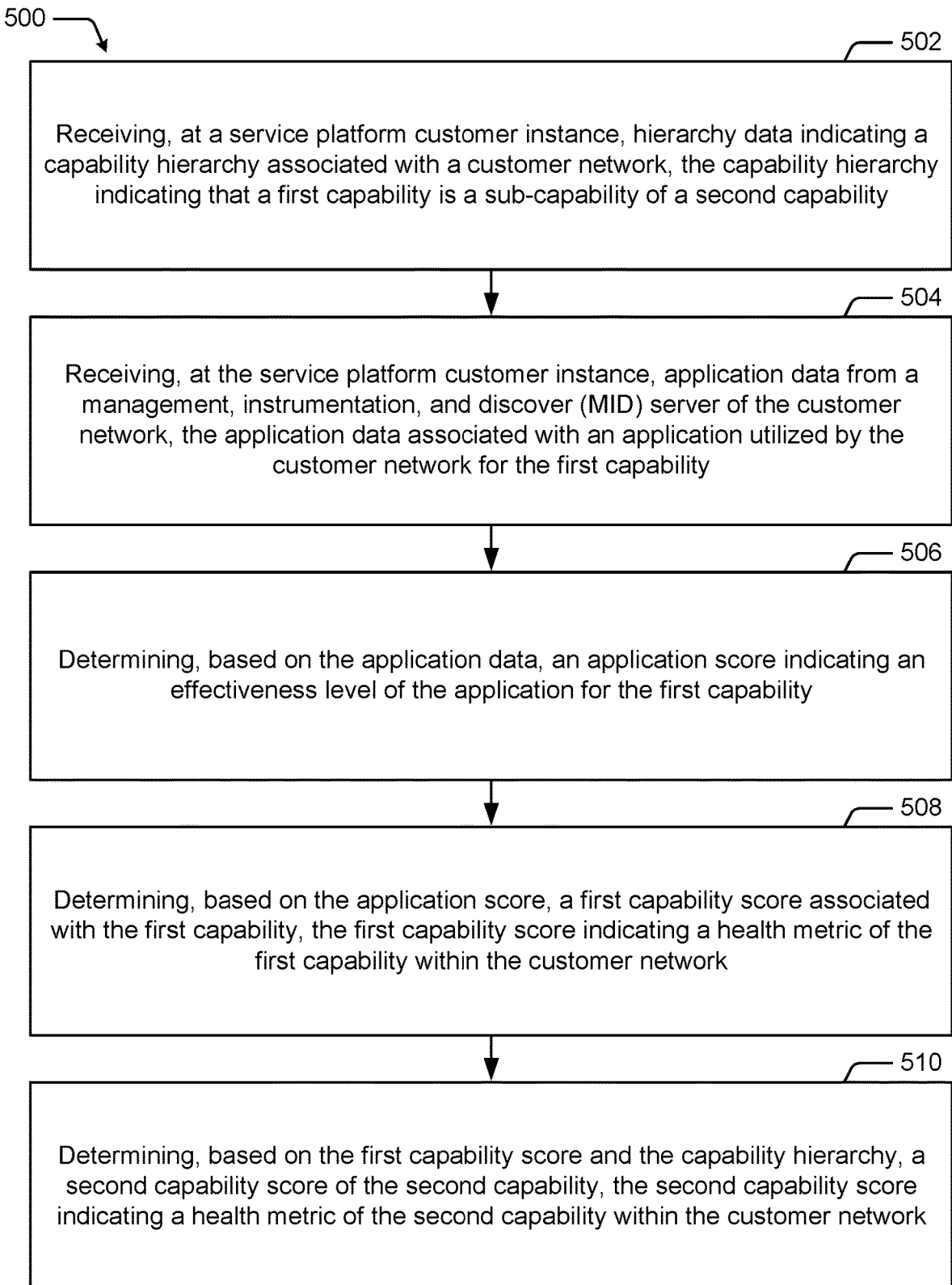
FIG. 5 is a flowchart of a method for capability based planning.

Referring to FIG. 5, a diagram illustrating a method 500 is shown. The method 500 may be performed by a service platform customer instance, such as the service platform customer instance 120. The method 500 includes receiving, at a service platform customer instance, hierarchy data indicating a capability hierarchy associated with a customer network, the capability hierarchy indicating that a first capability is a sub-capability of a second capability, at 502. In an illustrative example of the method 500, the service platform customer instance 120 of FIG. 1 receives the hierarchy data 130. The hierarchy data 130 indicates a capability hierarchy associated with the customer network 102. In particular, the capability hierarchy indicates that a first capability (e.g., the "manage opportunities" capability 104) is a sub-capability of a second capability (e.g., the "change design" capability 202) and that the customer network 102 uses an application for the first capability.

The method 500 further includes receiving, at the service platform customer instance, application data from a management, instrumentation, and discover (MID) server of the customer network, the application data associated with an application utilized by the customer network for the first capability, at 504. In the illustrative example of the method 500, the service platform customer instance 120 of FIG. 1 receives the application data 132 from the MID server 106. The application data is associated with the application used by the customer network 102 for the first capability. In other examples, the application data may also or in the alternative be received from one or more of the client devices 104A-C.

The method 500 further includes determining, based on the application data, an application score indicating an effectiveness level of the application for the first capability, at 506. In the illustrative example of the method 500, the service platform customer instance 120 of FIG. 1 determines the application score 140 based on the application data 132.

The method 500 further includes determining, based on the application score, a first capability score associated with the first capability, the first capability score indicating a health metric of the first capability within the customer network, at 508. In the illustrative example of the method 500, the service platform customer instance 120 of FIG. 1 determines the first capability score 142 based on the application score 140.

The method 500 further includes determining, based on the first capability score and the capability hierarchy, a second capability score of the second capability, the second capability score indicating a health metric of the second capability within the customer network, at 510. In the illustrative example of the method 500, the service platform customer instance 120 of FIG. 1 determines the second capability score 144 based on the first capability score 142 and the capability hierarchy. Thus, FIG. 5 depicts a method of determining information that may be used for capability based planning.

Figure 6:
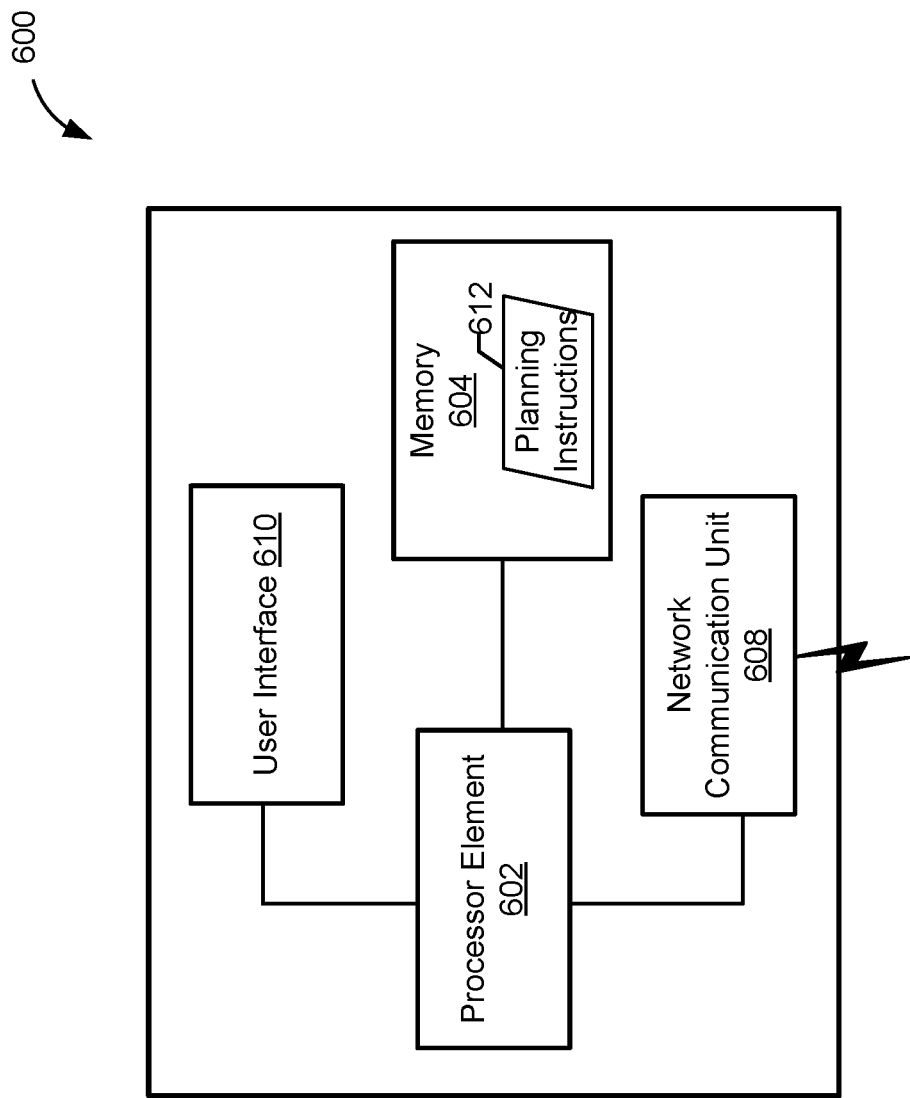
FIG. 6 is a block diagram illustrating a computing device for use with techniques described herein.

Referring now to FIG. 6, a block diagram illustrates a computing device 600 that may be used for implementing the techniques described herein in accordance with one or more embodiments. For example, the computing device 600 illustrated in FIG. 6 could represent a client device or a physical server device. The computing device may correspond to one or more of the client devices 104A-C, the MID server 106, the device(s) that provide the service platform customer instance 120, the device(s) that provide the first service platform customer instance 404, the device(s) that provide the second service platform customer instance 406, the device(s) of the first customer network 410, or the device(s) of the second customer network 412. As shown in FIG. 6, the computing device 600 can include one or more input/output devices, such as a network communication unit 608 that could include a wired communication component and/or a wireless communications component, which can be coupled to processor element 602. The network communication unit 608 can utilized any of a variety of standardized network protocols, such as Ethernet, TCP/IP, to name a few of many protocols, to effect communications between devices and comprise one or more transceiver(s) that utilize the Ethernet, power line communication (PLC), Wi-Fi, and/or other communication methods.

The computing device 600 includes a processor element 602 that contains one or more hardware processors, where each hardware processor may have a single or multiple processor cores. In one embodiment, the processor element 602 may include at least one shared cache that store data (e.g., computing instructions) that are utilized by one or more other components of processor element 602. For example, the shared cache may be locally cache data stored in a memory for faster access by components of the processor elements 602. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, the processor element 602 may also include one or more other types of hardware processing components, such as graphics processing units (GPU), application specific integrated circuits (ASICs), field-programmable gate arrays (FPGAs), and/or digital signal processors (DSPs).

FIG. 6 illustrates that memory 604 may be operatively coupled to processor element 602. Memory 604 may be a non-transitory medium configured to store various types of data. For example, memory 604 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution. In the illustrated example, the memory 604 stores planning instructions 612. The planning instructions 612 may be executable by the processor element 602 to perform any of the operations of methods described with respect to FIGS. 1-5.

Persons of ordinary skill in the art are aware that software programs may be developed, encoded, and compiled in a variety computing languages for a variety software platforms and/or operating systems and subsequently loaded and executed by processor element 602. In one embodiment, the compiling process of the software program may transform program code written in a programming language to another computer language such that the processor element 602 is able to execute the programming code. For example, the compiling process of the software program may generate an executable program that provides encoded instructions (e.g., machine code instructions) for processor element 602 to accomplish specific, non-generic, particular computing functions.

After the compiling process, the encoded instructions may then be loaded as computer executable instructions or process steps to processor element 602 from storage (e.g., memory 604) and/or embedded within the processor element 602 (e.g., cache). Processor element 602 can execute the stored instructions or process steps in order to perform instructions or process steps to transform the computing device into a non-generic, particular, specially programmed machine or apparatus. Stored data, e.g., data stored by a storage device, can be accessed by processor element 602 during the execution of computer executable instructions or process steps to instruct one or more components within the computing device 600.

A user interface 610 can include a display, positional input device (such as a mouse, touchpad, touchscreen, or the like), keyboard, or other forms of user input and output devices. The user interface 610 can be coupled to processor element 602. Other output devices that permit a user to program or otherwise use the computing device can be provided in addition to or as an alternative to network communication unit 608. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6.

For ease of discussion, FIG. 6 explanation of these other components well known in the art.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A method, comprising:
   receiving, by a service platform computational instance, from a server of a customer network, capability data related to a capability and an application utilized by the customer network for providing the capability;
   based on the capability data, determining, by the service platform computational instance, an application score indicating an effectiveness level of the application for providing the capability;
   determining, based on the application score, a capability score associated with the capability, the capability score indicating an effectiveness level of the customer network for providing the capability;
   determining a gap for the capability, wherein the gap comprises a difference between the capability score and a hypothetical capability score for the capability;
   receiving, by the service platform computational instance, life cycle data from the server, the life cycle data identifying a life cycle of the application, the life cycle specifying periods of developer support associated with the application;
   determining, by the service platform computational instance, a technology risk score based on the life cycle data and a current time;
   based on the application score, the capability score, the gap, and the technology risk score, generating, by the service platform computational instance, a recommendation to upgrade the application; and
   controlling, by the service platform computational instance, a client device of the customer network to display a graphical user interface indicating the life cycle, the technology risk score, and the recommendation to upgrade the application.

2. The method of claim 1, wherein the application score is a first application score, and the method comprises:
   making, by the service platform computational instance, a comparison of the first application score to a second application score associated with a second application utilized by the customer network for the capability, wherein the second application score indicates an effectiveness level of the second application for providing the capability; and
   based on the comparison, indicating that the second application score exceeds the first application score, and controlling, by the service platform computational instance, the client device of the customer network to display, on the graphical user interface, as part of the recommendation to upgrade the application, a recommendation to replace the application with the second application.

3. The method of claim 1, wherein the capability data is a first set of capability data and the customer network is a first customer network, the application score is a first application score, and the method comprises:
- receiving, by the service platform computational instance, from a second service platform computational instance having authorization from a second customer network to communicate with the service platform computational instance, a second set of capability data relating to a second application utilized by the second customer network for the capability;
- based on the received second set of capability data, determining, by the service platform computational instance, a second application score indicating an effectiveness level of the second application for providing the capability;
- making, by the service platform computational instance, a comparison of the first application score to the second application score; and
- based on the comparison, indicating that the second application score exceeds the first application score, and controlling, by the service platform computational instance, the client device of the customer network to display, on the graphical user interface, as part of the recommendation to upgrade the application, a recommendation to replace the first application with the second application.

4. The method of claim 1, wherein determining the technology risk score based on the life cycle data and the current time comprises determining a duration of remaining developer support based on the life cycle data and the current time and determining the technology risk score based on the duration of remaining developer support.

5. The method of claim 4, comprising:
- determining, by the service platform computational instance, a replacement application associated with an additional technology risk score indicative of a threshold high duration of remaining developer support,
- wherein the recommendation to upgrade the application includes an indication of the replacement application and the additional technology risk score.

6. The method of claim 1, wherein the periods of developer support include periods of external support and periods of internal support, wherein:
- the periods of external support include a pre-release period, a general availability period, an end of life period, and an obsolete period,
- the periods of internal support include an early adopter period, a mainstream period, a declining use period, and a retired period, and
- determining the technology risk score based on the life cycle data and the current time comprises determining the technology risk score based on a position of the current time relative to the periods of external support and the periods of internal support.

7. The method of claim 1, wherein the capability is a first capability, and the method comprises:
- receiving, by the service platform computational instance, hierarchy data indicating a capability hierarchy associated with the customer network, the capability hierarchy indicating that the first capability is a sub-capability of a second capability;
- determining, based on the capability score and on the first capability being the sub-capability of the second capability, a second capability score of the second capability, the second capability score indicating a second effectiveness level of the customer network for providing the second capability; and
- controlling, by the service platform computational instance, the client device of the customer network to display, on the graphical user interface, an indication of the second capability score.

8. The method of claim 7, comprising:
- controlling, by the service platform computational instance, the client device of the customer network to display, on the graphical user interface, an indication of a count of a plurality of sub-capabilities associated with the first capability,
- wherein the second capability score is determined based on respective capability scores associated with the plurality of sub-capabilities.

9. The method of claim 7, wherein the capability score is a first capability score, and the method comprises:
- controlling, by the service platform computational instance, the client device of the customer network to display, in a first region of the graphical user interface, an indication of the first capability score adjacent to a heading identifying the first capability; and
- controlling, by the service platform computational instance, the client device of the customer network to display, in a second region of the graphical user interface above the first region, an indication of the second capability score adjacent to a heading identifying the second capability,
- wherein the first region is indented farther from a side of the graphical user interface to indicate a hierarchical structure corresponding to the capability hierarchy.

10. The method of claim 1, wherein the recommendation to upgrade the application comprises an alternative application associated with a higher capability score than the application score of the application utilized by the customer network.

11. A computer-readable storage device storing instructions that, when executed by one or more processors, cause the one or more processors to perform operations comprising:
- receiving from a server of a customer network, capability data related to a capability and an application utilized by the customer network for providing the capability;
- based on the capability data, determining an application score indicating an effectiveness level of the application for providing the capability;
- determining, based on the application score, a capability score associated with the capability, the capability score indicating an effectiveness level of the customer network for providing the capability;
- determining a gap for the capability, wherein the gap comprises a difference between the capability score and a hypothetical capability score for the capability;
- receiving life cycle data from the server, the life cycle data identifying a life cycle of the application, the life cycle specifying periods of developer support associated with the application;
- determining a technology risk score based on the life cycle data and a current time;
- based on the application score, the capability score, the gap, and the technology risk score, generating a recommendation to upgrade the application; and
- controlling a client device of the customer network to display a graphical user interface indicating the life cycle, the technology risk score, and the recommendation to upgrade the application.

12. The computer-readable storage device of claim 11, wherein the application score is a first application score, and the operations comprise:

making a comparison of the first application score to a second application score associated with a second application utilized by the customer network for the capability, wherein the second application score indicates an effectiveness level of the second application for providing the capability; and based on the comparison, indicating that the second application score exceeds the first application score, and controlling the client device of the customer network to display, on the graphical user interface, as part of the recommendation to upgrade the application, a recommendation to replace the application with the second application.

13. The computer-readable storage device of claim 11, wherein the capability data is a first set of capability data and the customer network is a first customer network, the application score is a first application scores, and the operations comprise:

receiving from a second service platform computational instance having authorization from a second customer network to communicate with the service platform computational instance, a second set of capability data relating to a second application utilized by the second customer network for the capability;

based on the received second set of capability data, determining a second application score indicating an effectiveness level of the second application for providing the capability;

making a comparison of the first application score to the second application score; and based on the comparison, indicating that the second application score exceeds the application score, and controlling the client device of the customer network to display, on the graphical user interface, as part of the recommendation to upgrade the application, a recommendation to replace the first application with the second application.

14. The computer-readable storage device of claim 11, wherein determining the technology risk score based on the life cycle data and the current time comprises determining a duration of remaining developer support based on the life cycle data and the current time and determining the technology risk score based on the duration of remaining developer support.

15. The computer-readable storage device of claim 14, wherein the operations comprise:

determining a replacement application associated with an additional technology risk score indicative of a threshold high duration of remaining developer support, wherein the recommendation to upgrade the application includes an indication of the replacement application and the additional technology risk score.

16. A system, comprising:

one or more processors; and one or more memory devices storing instructions, that when executed by the one or more processors, cause the one or more processors to perform operations comprising:

receiving from a server of a customer network, capability data related to a capability and an application utilized by the customer network for providing the capability;

based on the capability data, determining an application score indicating an effectiveness level of the application for providing the capability;

determining, based on the application score, a capability score associated with the capability, the capability score indicating an effectiveness level of the customer network for providing the capability;

determining a gap for the capability, wherein the gap comprises a difference between the capability score and a hypothetical capability score for the capability;

receiving life cycle data from the server, the life cycle data identifying a life cycle of the application, the life cycle specifying periods of developer support associated with the application;

determining a technology risk score based on the life cycle data and a current time;

based on the application score, the capability score, the gap, and the technology risk score, generating a recommendation to upgrade the application; and controlling a client device of the customer network to display a graphical user interface indicating the life cycle, the technology risk score, and the recommendation to upgrade the application.

17. The system of claim 16, wherein the application score is a first application score, and the operations comprise:

making a comparison of the first application score to a second application score associated with a second application utilized by the customer network for the capability, wherein the second application score indicates an effectiveness level of the second application for providing the capability; and based on the comparison, indicating that the second application score exceeds the first application score, and controlling the client device of the customer network to display, on the graphical user interface, as part of the recommendation to upgrade the application, a recommendation to replace the application with the second application.

18. The system of claim 16, wherein the capability data is a first set of capability data and the customer network is a first customer network, the application score is a first application score, and the operations comprise:

receiving from a second service platform computational instance having authorization from a second customer network to communicate with the service platform computational instance, a second set of capability data relating to a second application utilized by the second customer network for the capability;

based on the received second set of capability data, determining a second application score indicating an effectiveness level of the second application for providing the capability;

making a comparison of the first application score to the second application score; and based on the comparison, indicating that the second application score exceeds the application score, and controlling the client device of the customer network to display, on the graphical user interface, as part of the recommendation to upgrade the application, a recommendation to replace the first application with the second application.

19. The system of claim 16, wherein determining the technology risk score based on the life cycle data and the current time comprises determining a duration of remaining developer support based on the life cycle data and the current time and determining the technology risk score based on the duration of remaining developer support.

20. The system of claim 19, wherein the operations comprise:

determining a replacement application associated with an additional technology risk score indicative of a threshold high duration of remaining developer support, wherein the recommendation to upgrade the application includes an indication of the replacement application and the additional technology risk score.

* * * * *